United States Patent [19]

Leibhard et al.

[11] 4,452,285

[45] Jun. 5, 1984

[54] DEVICE FOR FILLING BOREHOLES

[75] Inventors: Erich Leibhard, Munich; Armin Herb, Peissenberg; Arndt Bergner; Gusztav Lang, both of Munich, all of Fed. Rep. of Germany

[73] Assignee: Hilti Aktiengesellschaft, Schaan, Liechtenstein

[21] Appl. No.: 328,511

[22] Filed: Dec. 8, 1981

[30] Foreign Application Priority Data

Dec. 16, 1980 [DE] Fed. Rep. of Germany ....... 3047312

[51] Int. Cl.[3] ........................ B67C 3/00; G01F 11/00

[52] U.S. Cl. .................................... 141/392; 222/257; 222/320; 222/321; 401/265; 425/87

[58] Field of Search ............... 222/391, 379, 320, 321, 222/322, 323, 326, 327, 461, 522, 525, 256, 257, 259, 378, 381; 401/264, 265; 141/392

[56] References Cited

U.S. PATENT DOCUMENTS

| | | | |
|---|---|---|---|
| 1,379,471 | 5/1921 | Mood | 222/320 |
| 1,628,624 | 5/1927 | Liverance, Jr. | 222/321 |
| 1,667,782 | 5/1928 | Handelan | 222/525 X |
| 1,703,278 | 2/1929 | Claud-Mantle | 222/259 |
| 1,717,672 | 6/1929 | Fitch | 222/522 X |
| 1,720,874 | 7/1929 | Zerk | 222/257 |
| 1,956,072 | 4/1934 | Krause | 222/256 |
| 2,205,604 | 6/1940 | Sherbondy | 222/320 X |
| 2,694,211 | 11/1954 | Warren | 401/264 |
| 3,132,772 | 5/1964 | Bristow | 222/391 X |

*Primary Examiner*—Steven A. Bratlie

*Attorney, Agent, or Firm*—Toren, McGeady and Stanger

[57] ABSTRACT

In a dispensing device for filling boreholes with a single or multi-component adhesive, filler, sealer or primer, the material is conveyed from storage containers holding the individual components through a supply pipe and an outlet nozzle which dispenses the material directly into the borehole. By manually operating a handle lever, material is displaced out of the storage container into the supply pipe. Further, an actuating unit operated by the handle lever is connected to the outlet nozzle for telescoping it relative to the supply pipe whereby material is displaced out of the supply pipe through the outlet nozzle into the borehole.

8 Claims, 4 Drawing Figures

DEVICE FOR FILLING BOREHOLES

SUMMARY OF THE INVENTION

The present invention is directed to a device for filling a borehole with a single or multi-component adhesive, filler, sealer or primer. The device includes storage containers holding the individual components and a handle lever is connected to a unit for displacing the material out of the storage containers to an output unit.

In the placement of anchors, where a specific amount of a hardenable substance is introduced into a borehole for anchoring a tie rod, there are basically two practical ways in which hardenable substance can be dispensed into the borehole.

In one method a measured amount of a hardenable substance is packed in a destructible covering or envelope. Such a package is introduced into the borehole and is broken or destroyed by then inserting the tie rod into the borehole. Particularly in view of the packaging required for such an operation, the method is relatively complicated and, therefore, quite expensive. Moreover, the packages of the hardenable substance causes problems, because they may be prematurely damaged before being inserted into the borehole, such as during transportation or handling, and are thus rendered useless.

In another method, the hardenable substance is charged into the borehole by a device containing large storage containers usually holding enough of the substance for several boreholes. This method has the problem that air pockets may develop as the borehole is being filled causing a reduction in the extraction value of the anchor. To prevent such air pockets, there is a known device including a tube which can be filled with the substance and then the tube is inserted for the full length of the borehole so that its opening is located at the bottom of the borehole. While retracting the tube from the borehole, its contents are pressed by a plunger slidably displaceable within the tube. This method is very complicated because the tube must be filled before each charging step and there is the problem of the substance dripping out of the device. Furthermore, retraction of the tube is performed completely by the operator so that a fast retraction is possible which, under certain circumstances, can lead to the formation of air pockets.

Therefore, the primary object of the present invention is to provide a device which makes it possible to fill the borehole effectively and without the inclusion of any air pockets.

In accordance with the present invention, the device comprises dispensing means including a supply pipe and an outlet nozzle with the supply pipe connected with the device. The outlet nozzle can be inserted into a borehole and it is in cooperating relation with the supply pipe so that by telescopingly sliding the outlet nozzle relative to the supply pipe the substance can be dispensed into the borehole.

In accordance with the present invention, the movement of the outlet nozzle is related to the dispensing of the substance from the device. With this arrangement the outlet nozzle is only displaced out of the borehole to the extent that the borehole is filled with the substance. The outlet nozzle can be inserted into the supply pipe or it can surround the supply pipe. When it surrounds the supply pipe, the supply pipe acts as the means for pressing the substance into the outlet nozzle. If the outlet nozzle is inserted into the supply pipe, then the nozzle serves as a plunger for displacing the substance out of the supply pipe.

Initially, the substance is moved from the storage containers into the supply pipe by displacing means. It is advantageous if the material flows through ducts from the storage containers into the supply pipe. These ducts may be tubular members or in the form of recesses in the housing for the device.

The ducts extending between the storage containers and the supply pipe may be selected as desired. In view of the flow pattern, however, it is advantageous if the ducts open in the radial direction into the supply pipe. The components forming the substance are stored separately in the containers and must be mixed before the substance is charged into the borehole. With the ducts opening into the supply pipe in the radial direction, a mixing of the components is developed. The ducts can be located on opposite sides of the supply pipe or they can be arranged to one another. In either case, an effective mixing of the components results due to the directional flow into the supply pipe. To improve the mixing action, sheet metal deflectors can be arranged within the supply pipe in the path of flow so that a reversing action is imparted to the inflowing components.

The substance is charged into the borehole with the aid of the outlet nozzle. To reach the bottom of the borehole, it is advantageous if the outlet nozzle is tubular. The outside diameter of the outlet nozzle may correspond essentially to the diameter of the borehole. The outlet nozzle can be exchanged for various borehole diameters.

As mentioned above, when a multi-component substance is used, the individual components must be mixed together before they are charged into the borehole. To achieve a good mixing action, it is advantageous if the outlet nozzle contains a mixing insert. The mixing insert divides and then recombines the mixed components by means of baffle plates as the components flow through the outlet nozzle. If this division and recombination occurs several times in succession, a homogeneous mixture of the components results. If there is a long interrruption in the use of the device, the mixed components within the mixing insert may harden. If this occurs the mixing insert or the insert along with the outlet nozzle can be replaced.

During use, after the outlet nozzle is inserted into the borehole, the nozzle is retracted out of the borehole by means attached to the nozzle while the substance is dispensed into the borehole. To provide a uniform as possible removal of the outlet nozzle from the borehole, it is advantageous if the means connected to it are in the form of a feeder member which can be connected to the handle lever. The feeder member may be in the form of a rack with a lever interacting with the rack. However, a simple clamping arrangement is also possible. The connection of the retraction means with the handle or lever makes it possible to achieve the desired withdrawal of the nozzle in accordance with the conditions encountered. Since the expenditure of force for retracting the outlet nozzle is relatively small, the retraction means can be relatively large so that the removal of the outlet nozzle can be effected by several displacements of the handle lever. When processing a substance with the device according to the present invention, initially the supply pipe and the outlet nozzle must be filled by the means which presses the components out of the storage containers, and then the outlet nozzle must be pulled back by the retraction means. Since these two operations are performed timewise one after the other, it is advantageous if a switching mechanism is provided to alternate the motion of the manual lever between the means pressing the components out of the storage containers and the means for retracting the outlet nozzle. Depending on its position, the switching mechanism permits performance of one or the other of these two operations. It is not necessary for the handle lever to be released while these operations are being performed.

The distance required to carry out the switching operation is relatively small. However, different spring tensions must be overcome. To make simple switching possible, it is advantageous for the switching mechanism to be an eccentric lever. An eccentric lever requires simple rotation for carrying out the switching movement. Due to a favorable determination of the eccentricity or the operating angle, the switching mechanism can be arranged so that it is automatically locked in the end positions and no special holding elements are required.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2:
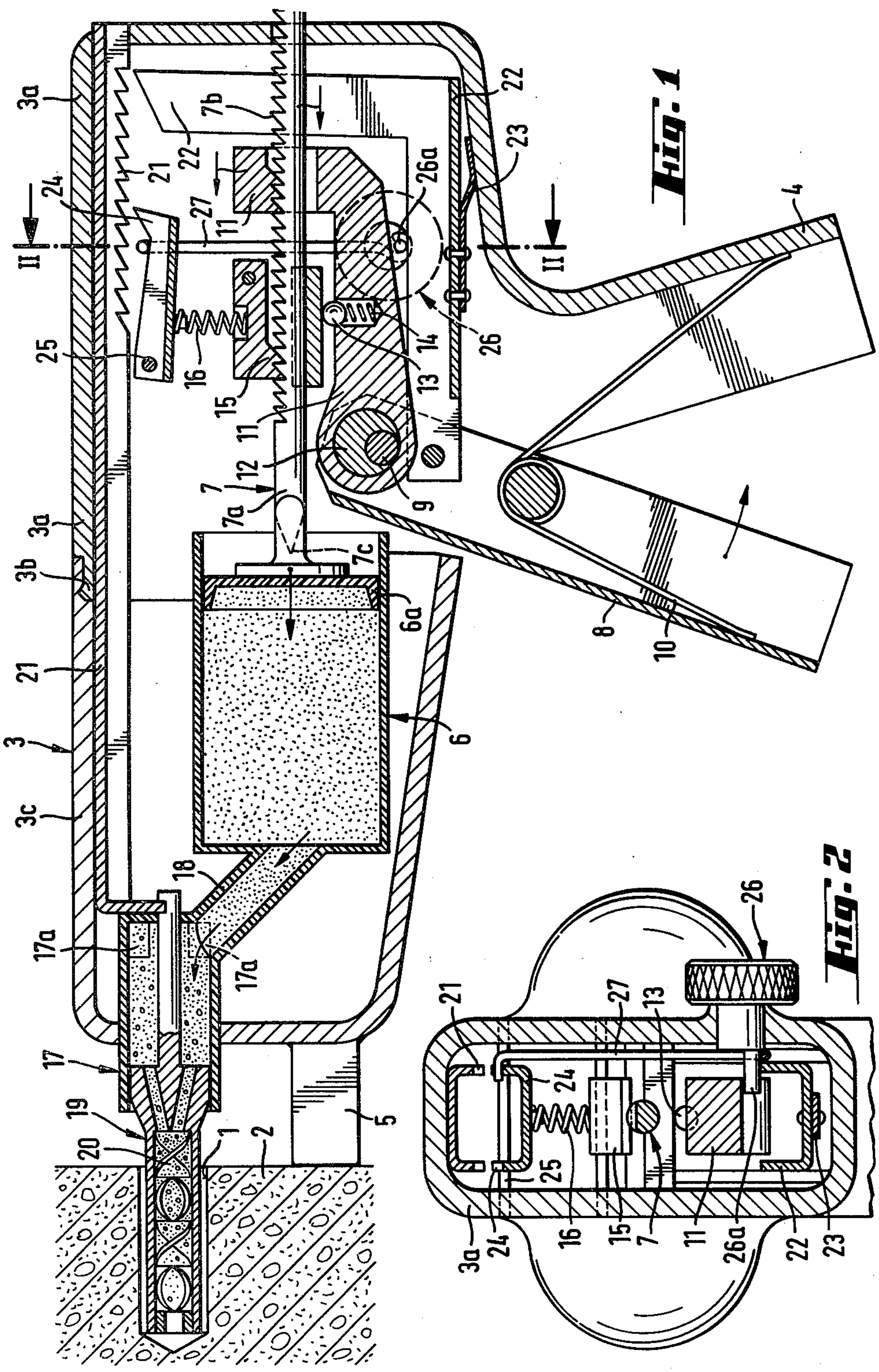
FIG. 1 is a cross sectional view through a device embodying the present invention and illustrating the device during the operation of pressing the components out of the storage containers.
FIG. 2 is a cross sectional view taken along the line II—II in FIG. 1.

The device embodying the present invention, as illustrated in FIGS. 1 to 4, is used to fill a borehole 1 in a receiving material 2 with a substance such as an adhesive, filler, sealer or primer. The device includes a housing or casing 3 in the general form of a hand-held tool. Casing 3 is made up of a rear section 3*a* which contains a driving mechanism, and a front section 3*c* detachably connected to the rear section by a locking section 3*b*. A handle or hand grip 4 is formed on and extends downwardly from the rear section 3*a*. As viewed in FIG. 1 the housing 3 has a front end facing the receiving material 2 and a rear end located at the opposite end of the housing. A stop element 5 is secured to and extends outwardly from the front end of the front section 3*c* and serves to support the device at a given distance from the surface of the receiving material containing the borehole 1. Two storage containers 6, each arranged to hold one component of a multi-component substance, are arranged next to one another within the front section 3*c* of the housing 3. When the components in the storage containers 6 are mixed the mixed substance is filled into the borehole 1. A plunger or ram 6*a* is slidably supported in each of the supply containers 6 and is arranged to press against the component located within the container for displacing it out of the container. A common drive member 7 is connected to the plungers 6*a* for displacing them through the storage conainers 6 toward the front end of the housing 3. Drive member 7 includes an axially elongated drive shaft 7*a* having a plurality of toothed detents 7*b* formed on one of its elongated sides. Adjacent its front end where it is connected to the plunger 6*a*, the drive member 7 is provided with a known cutting edge 7*c* for cutting the wall of the storage container 6 as the plunger is pushed forwardly through it. A manually operable handle lever 8 is rotatably mounted about an axle 9 and it is located adjacent to the handle 4. A torsion spring 10 is provided in contact with the handle 4 and the handle lever 8 and biases the handle lever into a starting position. At the upper end of the handle lever 8, a pawl 11 is pivotally connected to it by an eccentrically arranged peg 12 located on the axle 9. In the position shown in FIG. 1, pawl 11 is placed into engagement with the toothed detents 7*b* on the shaft 7*a* of the drive member 7 by means of a ball 13 supported between a cross-member of the housing 3 and spring 14 supported in a recess in the pawl 11. When the handle lever 8 is pivoted toward the handle 4 against the action of the spring 10, the drive member 7 moves the plunger 6*a* in the forward direction toward the stop element 5. Within the housing 3, a stop cam 15 is in engagement with the tooth detents 7*b* due to the biasing action of a compression spring 16. Stop cam 15 holds the drive member 7 in position and prevents it from being pushed in the rearward direction during operation when the pawl 11 is not in engagement with the tooth detents 7*b*.

Supported in the front section 3*c* of the housing 3 and projecting outwardly from the front end of the housing, is a supply pipe 17. Supply pipe 17 is connected with the storage containers 6 via tubular ducts 18. Basically, ducts 18 open radially into the supply pipe 17, note FIG. 4. The ducts open into the rearward end of the supply pipe and sheet metal deflectors or vanes 17*a* are located in the rearward part of the pipe. Sheet metal deflectors 17*a* assure a thorough mixing of the components supplied from the storage containers 6 into the supply pipe 17. Extending forwardly from the front end of the supply pipe 17 is an outlet nozzle 19 which is telescopically slidable relative to the supply pipe. During one part of the operation cycle of the device, when the handle lever 8 is pressed, the mechanism for displacing the components out of the storage containers 6 made up of the pawl 11 and the drive member 7, displace a part of the substance components from the containers 6 through the ducts 18 into the supply pipe 17. The components flowing into the supply pipe 17 displace the outlet nozzle 19 forwardly toward the receiving material 2 into the position shown in FIG. 1.

In addition to the mixing of the components provided within the supply pipe 17, a further mixing takes place as the components pass through the outlet nozzle 19 which contains a mixing insert 20. The retraction of the mouthpiece out of the borehole 1 with its telescopic movement into the supply pipe 17 is effected by a mechanism located within the housing and made up of a rack 21 connected at its forward end to the outlet nozzle 19 and a stop lever 22 which can be placed in engagement with the tooth detents in the rear end of the rack. Stop lever 22 is L-shaped with the free end of one leg arranged to engage the tooth detents in the rack 21 and the free end of the other leg is hinged to the handle lever 8 adjacent the axle 9. A flat spring 23 mounted within the rear section 3*a* of the housing biases the stop lever into contact with the rack. To prevent movement of the rack 21 when it is not in engagement with the stop lever 22, a locking lever 24 is pivotally mounted within the housing. Locking lever 24 is pivotally mounted, adjacent one end, on a pin 25 and a spring 16 biases the locking lever 24 about the pin into contact with the tooth detents in the rack 21. An eccentric lever 26 is mounted within the housing and serves as a switching member alternatively placing the drive member 7 or the rack 21 into operation. Eccentric lever 26 has an eccentrically arranged pin 26*a*. As shown in FIGS. 1 and 2, pin 26*a* contacts the stop lever 22 and pivots it downwardly out of engagement with the rack 21 against the upwardly biasing force of the flat spring 23. Locking lever 24 is connected to the pin 26*a* by a rod 27 and in FIG. 1 the locking lever 24 is pivoted downwardly about the pin 25 so that it is out of engagement with the rack 21.

At this point in the cycle of operation, pawl 11 is engaged with the tooth detents 7*b* in the shaft 7*a*. With the pawl 11 in engagement with the shaft 7*a*, by pivoting the handle lever 8 toward the handle 4, the drive member 7 moves toward the front end of the housing 3, that is, toward the stop element 5 while the rack 21 connected to the outlet nozzle is not moved. In this position of the eccentric lever 26, the components within the storage containers 6 are displaced through the ducts 18 into the supply pipe 17. Since the outlet nozzle 19 and the rack 21 connected to it are freely movable, the action of the mixed components flowing into the supply pipe 17 and through the pipe into the outlet nozzle 19 toward the base of the borehole 1 in the receiving material, moves the outlet nozzle and the rack toward the receiving material until the front end of the rack rests against the rear end of the supply pipe 17. The front section 3*c* of the housing 3 can be removed for replacing or refilling the storage container 6.

In FIG. 2 a cross section through the rear section 3*a* of the casing 3 is shown displaying the drive member 7 as well as the pawl 11 which is in engagement with the drive member, and the stop cam 15. Further, in the upper region of the rear section 3*a*, it can be seen that the rack 21 is U-shaped in cross section with the opening of the U-shaped section facing downwardly. In the bottom of the rear section 3*a* the stop lever 22 is also U-shaped in cross section. This arrangement makes possible a partial enclosure of the pawl 11 and the stop lever 22 and affords a compact construction. Flat spring 23 is connected to the horizontally extending leg of the stop lever 22. Pin 26*a* on the eccentric lever 26 presses the stop lever 22 downwardly against the force of the flat spring 23. In this arrangement the pawl 11 is free to move upwardly. Locking lever 24 is pulled downwardly by means of the rod 27 connected to the eccentric lever 26 with the locking lever moving against the force of the compression spring 16 so that it is held in disengagement relative to the rack 21.

Figures 3, 4:
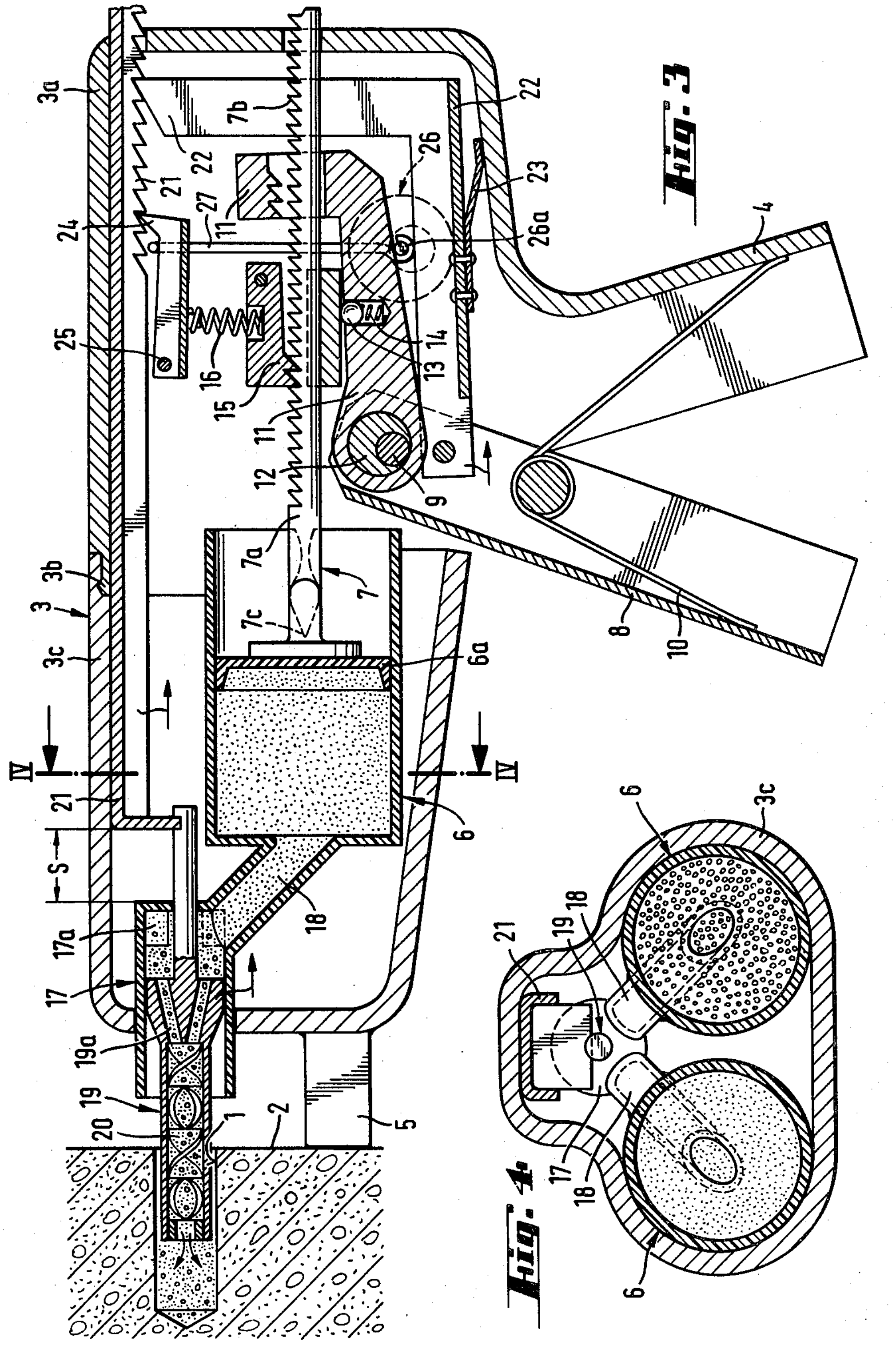
FIG. 3 is a sectional view similar to FIG. 1, however, illustrating the operation of retracting the outlet nozzle out of the borehole.
FIG. 4 is a cross sectional view taken along the line IV—IV in FIG. 3.

In FIG. 3 the device illustrated in FIG. 1 is shown with the outlet nozzle 19 partially retracted out of the borehole 1 and moved telescopically rearwardly into the supply pipe 17. This rearward movement is made possible by rotating the eccentric lever 26. As can be seen in FIG. 2 the eccentric lever 26 is located exteriorly of the rear section 3*a* of the housing 3 so that it can be manipulated. As the eccentric lever is rotated pin 26*a* eccentrically located on the lever moves upwardly, that is, in the direction away from the handle 4. Pin 26*a* presses the pawl 11 upwardly and disengages the pawl from the tooth detents 7*b* in the shaft 7*a* of the drive member 7 against the force of the spring 14 which biases the ball 13 against the stationary cross member within the housing. In this position of the eccentric lever 26, stop lever 22 and locking lever 24 are released and both move into engagement with the rack 21 due to the force of the flat spring 23 acting on the stop lever 22 and of the compression spring 16 acting on the locking lever 24. When the handle lever 8 is actuated with the device in the position shown in FIG. 3, the rack 21 and the outlet nozzle connected to it are retracted or moved rearwardly relative to the housing and the supply pipe 17. As compared to the position shown in FIG. 1, the outlet nozzle 17 is displaced out of the borehole by the distance S. As the outlet nozzle is retracted, a corresponding amount of the mixed substance within the supply pipe is charged into the borehole through the bores 19*a* in the outlet nozzle passing over the mixing insert 20 so that the outlet nozzle acts as a plunger. During this operation, stop element 5 supports the front end of the device at a given spacing from the surface of the receiving material 2. When the outlet nozzle 19 moves rearwardly into the supply pipe 17 until it contacts the sheet metal deflectors 17*a*, the substance in the supply pipe has been displaced as much as possible through the outlet nozzle 19 into the borehole 1. To refill the supply pipe 17, the eccentric lever is again rotated and moved into the position shown in FIGS. 1 and 2. With such a movement, stop lever 22 and locking lever 24 are disengaged from the rack 21, and the pawl 11 again engages the tooth detents 7*b* on the shaft 7*a* of the drive member 7. The device is now ready to refill the supply pipe 17. As the supply pipe 17 is being filled, the outlet nozzle 19 and the rack is returned into the position shown in FIG. 1. The filling action may take place while the nozzle 19 of the device is being inserted into a new borehole 1.

Instead of guiding the outlet nozzle 19 within the supply pipe 17, the outlet nozzle can be arranged to enclose the supply pipe. In such an arrangement, the supply pipe with the substance contained therein serves as the displacement plunger pressing the substance out through the outlet nozzle 19.

The cross section of the device displayed in FIG. 4 shows the two storage containers 6 arranged next to one another. Ducts 18 extend from the storage containers 6 into the supply pipe 17. As can be seen in this figure, the ducts extend basically radially into the supply pipe 17. In the front section 3*c* of the housing, the connection of the rack 21 with the rearward extension of the outlet nozzle 19 can be noted.

While specific embodiments of the invention have been shown and described in detail to illustrate the application of the inventive principles, it will be understood that the invention may be embodied otherwise without departing from such principles.

We claim:

1. Device for filing boreholes with a flowable substance such as a single or multi-component adhesive, filler, sealer or primer, comprising a storage container for each of the components of the substance to be filled into the borehole, a housing for holding said storage container, said housing having a front end from which the substance is dispensed and a rear end, means located at the front end of said housing for dispensing the substance, means located within said housing for flowably displacing the substance from each said storage container to said dispensing means, a first lever pivotally mounted on said housing and interconnectable with said displacing means for operating said displacing means and supplying the substance from each said storage container to said dispensing means, wherein the improvement comprises that said dispensing means includes a supply pipe mounted in the front end of said housing for receiving the substance from each said storage container, an outlet nozzle arranged to receive the substance from said supply pipe and also arranged to be inserted into the borehole for supplying the material directly into the borehole, and means located within said housing and engageable with said outlet nozzle for telescopically displacing said outlet nozzle into said supply pipe for displacing the substance from said supply pipe through said outlet nozzle into the borehole, said means for telescopically displacing said outlet nozzle comprises an elongated feed member located within said housing and connected to said outlet nozzle, and a second lever pivotally connected to said first lever and selectively engageable with said feed member for displacing said feed member in the elongated direction thereof, and a switching mechanism for alternately applying the motion of said first lever to said means for displacing the substance from said storage container and to said second lever selectively engageable with said feed member for displacing said feed member and retracting said outlet nozzle into said supply pipe.

2. Device as set forth in claim 1, including a duct connected to each said storage container and to said supply pipe for conveying the substance component from said storage container into said supply pipe.

3. Device, as set forth in claim 2, wherein said duct extends substantially radially into said supply pipe.

4. Device, as set forth in claims 1, 2 or 3 wherein said outlet nozzle is a tubular member.

5. Device, as set forth in claim 4, including a mixing insert located within and extending in the axial direction of said outlet nozzle.

6. Device, as set forth in claim 1, wherein said switching mechanism comprises an eccentric lever.

7. Device, as set forth in claim 6, wherein said first lever is mounted on said housing on the exterior surface thereof and said eccentric lever is located on the exterior of said housing and includes an eccentric pin located thereon extending inwardly into said housing for effecting the desired switching action.

8. Device, as set forth in claim 1, wherein said means located within said housing for displacing the substance from each said storage container comprises a plunger, an elongated drive member connected to said plunger, a pawl member pivotally connectable to said first lever, said pawl member arranged to engage said drive member for pressing the substance component out of each said storage container, said means for telescopically displacing said outlet nozzle comprising a rack extending through said housing in the front end and rear end direction and connected at the front end thereof to said outlet nozzle, a stop lever connected to said first lever and selectively engageable with said rack for displacing said rack and said outlet nozzle in the direction toward the rear end of said housing, and switching means arranged to selectively alternately engage one of said pawl member with said drive member and said stop lever with said rack for effecting in sequence the supply of the substance into said supply pipe and the charging of the substance from said supply pipe through said outlet nozzle into the borehole.

* * * * *